(12) United States Patent
Cox (10) Patent No.: US 11,309,699 B2
(45) Date of Patent: Apr. 19, 2022

(54) CONTROL SYSTEM FOR AND METHOD OF FAULT LOCATION, ISOLATION AND SUPPLY RESTORATION

(71) Applicant: Electricity North West Property Limited, Stockport (GB)

(72) Inventor: Steve Cox, Cheshire (GB)

(73) Assignee: Electricity North West Property Limited, Stockport (GB)

( * ) Notice: Subject to any disclaimer, the term of this patent is extended or adjusted under 35 U.S.C. 154(b) by 169 days.

(21) Appl. No.: 16/761,466

(22) PCT Filed: Oct. 17, 2018

(86) PCT No.: PCT/EP2018/078455
§ 371 (c)(1),
(2) Date: May 4, 2020

(87) PCT Pub. No.: WO2019/091737
PCT Pub. Date: May 16, 2019

(65) Prior Publication Data
US 2020/0295557 A1    Sep. 17, 2020

(30) Foreign Application Priority Data

Nov. 8, 2017  (EP) .................................. 17200688

(51) Int. Cl.
*H02H 3/06* (2006.01)
*H02H 3/033* (2006.01)
(Continued)

(52) U.S. Cl.
CPC ............ *H02H 3/063* (2013.01); *H02H 3/033* (2013.01); *H02H 7/28* (2013.01); *H02J 3/0073* (2020.01); *H02J 13/0004* (2020.01)

(58) Field of Classification Search
CPC .......... H02H 3/063; H02H 3/033; H02H 7/28; H02J 13/004; H02J 13/0073
See application file for complete search history.

(56) References Cited

U.S. PATENT DOCUMENTS 8,538,708 B2 * 9/2013 Yadav ............... H02J 13/00034
702/58
2002/0080539 A1    6/2002 McClure et al.
(Continued)

FOREIGN PATENT DOCUMENTS

EP    2056424 A2    5/2009
EP    2757648 A2    7/2014

OTHER PUBLICATIONS

S. K., S. N. Singh and S. C. Srivastava, "A Synchrophasor Assisted Frequency and Voltage Stability Based Load Shedding Scheme for Self-Healing of Power System," in IEEE Transactions on Smart Grid, vol. 2, No. 2, pp. 221-230, Jun. 1, 2011.
(Continued)

*Primary Examiner* — Scott Bauer
(74) *Attorney, Agent, or Firm* — McAfee Taft, A Professional Corporation (57) ABSTRACT

A control system for and a method of fault isolation and electrical power restoration on an electrical network are provided and comprise: a plurality of electrical power supply facilities connectable to a region of a network, the region comprising a plurality of segments, and each segment being connectable to one or more neighbouring segments by a respective switching device; and the method including the steps of: detecting a fault condition within the region; operating the plurality of switching devices connecting the segments within the region so as to disconnect those segments from one another; performing a reconnection routine for each of a plurality of reconnection zones, being run concurrently.

20 Claims, 6 Drawing Sheets

(51) Int. Cl.
*H02J 13/00* (2006.01)
*H02J 3/00* (2006.01)
*H02H 7/28* (2006.01)

(56) References Cited

U.S. PATENT DOCUMENTS

| | | | |
|---|---|---|---|
| 2008/0225452 A1* | 9/2008 | Stoupis | H02J 13/00016 361/62 |
| 2011/0004355 A1* | 1/2011 | Wang | H02J 13/0004 700/286 |
| 2012/0203479 A1 | 8/2012 | Yadav et al. | |
| 2012/0239601 A1* | 9/2012 | Wang | H02J 13/00034 706/13 |
| 2012/0249286 A1* | 10/2012 | Bush | H02H 7/261 340/3.43 |
| 2013/0069437 A1* | 3/2013 | Biallas | H04L 12/413 307/80 |
| 2014/0107852 A1* | 4/2014 | Horsfield | H02J 3/144 700/295 |

OTHER PUBLICATIONS

Extended Search Report for European patent application No. 17200688.4 (Electricity North West Property Limited) Jun. 20, 2018.
International Search Report and Written Opinion of the International Searching Authority for PCT/EP2018/078455, dated Feb. 1, 2019 (Electricity North West Limited) Feb. 1, 2019.

\* cited by examiner

CONTROL SYSTEM FOR AND METHOD OF FAULT LOCATION, ISOLATION AND SUPPLY RESTORATION

DESCRIPTION OF INVENTION

An electrical grid is a network for delivering electricity from electrical generators to consumers. Power stations supply electrical power to an electrical power transmission or distribution network collectively forming the electrical grid.

The network includes substations, at which the voltage of the supplied electricity is stepped down to an appropriate distribution level to be supplied to the population. From a substation, electricity is supplied to a portion of the network which provides electrical power to a number of properties which may include residential, commercial or industrial properties, for example, or any combination of types of property or other facility requiring electrical power. In a densely populated residential area, a substation typically supplies electrical power to several hundred residential properties, for example. In a more sparsely populated rural area, a substation may supply a smaller number of properties.

The network is typically divided into multiple segments each of which can be disconnected from adjacent segments in the event that maintenance must be carried out—to upgrade or repair equipment used within that segment, for example. For example, properties sharing a residential street may be powered by a single segment of the network, and neighbouring streets powered by other respective segments. These segments may be disconnected and/or reconnected using a switch (or other device such as a fuse or link). During normal operation, the switches are typically closed to allow electrical power transmission between segments. The switches may be operated remotely over a control network for example, to oversee and control the operation of the switches on the network.

The network is typically split into regions, each typically being supplied with power from a single substation. Multiple regions are capable of being connected to each other using network interconnection switches, to improve reliability. If a fault occurs at a first substation in a first region, the properties supplied with electricity by that substation can be connected to another one of the regions of the network, via the network interconnection switches, and thereby supplied by another substation. These network interconnection switches may be controlled remotely as part of the control network.

Fault location, isolation, and supply restoration (FLISR) is the name given to a generic system that is used on public electricity supply networks. The system reconfigures the network automatically using remote control equipment whenever a fault occurs. FLISR is typically triggered by a network fault coupled with co-incident alarms and indications received through a SCADA (Scanning and Data Acquisition) system. Diagnostic systems and data fed back to the control system allow the system to determine approximately which part of the local network is responsible for the fault occurring. Using the known network electrical connectivity configuration and details of the alarms raised, the FLISR segments the network that contains the fault and sequentially re-energises parts of the network, so as to leave only the effected segment without power.

This re-energisation is performed in two ways. First, for segments of the network believed to be healthy (based on the output of diagnostic equipment and fault passage indications or protection relay indications), power is supplied to those parts using adjacent network interconnection switches. In this way, electrical power is supplied from alternative local substations.

Second, the electrical power is restored sequentially, one segment at a time, from the source substation within the region, via its reset circuit breaker or automatic switch.

Such systems rely on providing a step by step sequential restoration, from the source electrical power supply facility. Electrical power can only be supplied from other sources, such as adjacent network interconnection switches, once the relevant section of the network is known to be healthy. Otherwise, if a section of faulty network were energised from adjacent network interconnection switches then the customers fed from the adjacent network would also be affected as the fault causes disconnection of power supplied to that interconnected network.

Where networks have a high number of remotely controllable switches, the time taken to locate the section of the network within which the fault exists can be relatively long. For example, locating the segment containing the fault may take between three and five minutes, on average, when dealing with a region of average size (in terms of the number of segments involved). After each segment is connected, the system must wait for a certain length of time to pass so that any fault will be triggered and detected. This time delay is driven by the communications systems reporting to and from the control system, which must issue instructions to close each switch and subsequently wait for confirmation that the operation is complete and that no fault occurred, before the next segment is tested.

The present invention seeks to ameliorate or overcome one or more problems associated with the prior art.

According to a first aspect of the invention we provide a method of fault isolation and electrical power restoration on an electrical network of the type comprising:

a plurality of electrical power supply facilities connectable to a region of a network to provide electrical power to that region of the network, the region comprising a plurality of segments, and each segment being connectable to one or more neighbouring segments by a respective switching device operable to connect and disconnect electrical power transmission between the segments; and the method including the steps of:

detecting a fault condition within the region;

operating the plurality of switching devices connecting the segments within the region so as to disconnect those segments from one another;

performing a reconnection routine for each of a plurality of reconnection zones, each reconnection zone comprising a distinct plurality of adjoining segments within the region and each comprising a segment that is connectable to one of the electrical power supply facilities so that each reconnection zone is associated with a different one of the electrical power supply facilities, the reconnection routines for each of the reconnection zones being run concurrently, and each including the steps a to d of:

a) selecting from the set of all unpowered segments within the reconnection zone a single unpowered segment that is connectable to a neighbouring powered segment within the reconnection zone, or is connectible to the electrical power supply facility associated with the reconnection zone, b) operating one or more switching devices to connect the selected segment to provide electrical power to that selected segment,
c) determining whether a fault has occurred within the reconnection zone,
d) if a fault is determined to have occurred at step c, setting a halt status and identifying the selected segment as the segment causing the fault condition,
or else repeating steps a to d until all segments within the reconnection zone are electrically connected to the respective electrical power supply facility, or until a halt status is set by another one of the concurrent reconnection routines;
isolating the segment identified as causing the fault condition by operating the switching devices to disconnect that segment from its neighbouring segments; and
operating the switching devices to reconnect the segments within the region to an electrical power supply facility, excluding the identified isolated segment.

According to a second aspect of the invention we provide a control system for performing fault isolation and electrical power restoration on an electrical network, of the type comprising:
a plurality of electrical power supply facilities connectable to a region of a network to provide electrical power to that region of the network, the region comprising a plurality of segments, and each segment being connectable to one or more neighbouring segments by a respective switching device operable to connect and disconnect electrical power transmission between the segments; and
the control system comprising a controller that is communicatively coupled with the switching devices so as to operate the switching devices remotely, the controller having a processing unit comprising one or more processor cores and being operable to execute a plurality of process threads,
the controller being configured to:
detect a fault condition within the region;
operate the plurality of switching devices connecting the segments within the region so as to disconnect those segments from one another;
execute a plurality of reconnection routines as threads running concurrently on the one or more processor cores, each reconnection routine being associated with a respective reconnection zone comprising a distinct plurality of adjoining segments within the region and each comprising a segment that is connectable to one of the electrical power supply facilities so that each reconnection zone is associated with a different one of the electrical power supply facilities, the reconnection routine including the steps a to d of:
a) selecting from the set of all unpowered segments within the reconnection zone a single unpowered segment that is connectable to a neighbouring powered segment within the reconnection zone, or is connectible to the electrical power supply facility associated with the reconnection zone,
b) operating one or more switching devices to connect the selected segment to provide electrical power to that selected segment,
c) determining whether a fault has occurred within the reconnection zone,
d) if a fault is determined to have occurred at step c, setting a halt status and identifying the selected segment as the segment causing the fault condition,
or else repeating steps a to d until all segments within the reconnection zone are electrically connected to the respective electrical power supply facility, or until a halt status set by another one of the concurrent reconnection routines;
operating switching devices associated with the segment identified as causing the fault condition to disconnect that segment from its neighbouring segments; and
operating the switching devices to reconnect the segments within the region to an electrical power supply facility, other than the switching devices associated with the identified isolated segment.

According to a third aspect of the invention we provide a computer program for a control system according to the second aspect of the invention, comprising instructions which, when the program is executed by a computer, cause the computer to carry out the method of the first aspect of the invention.

Further aspects of the above embodiments of the invention are set out in the appended claim set.

We now describe features of embodiments of the invention, by way of example only, with reference to the accompanying drawings of which

Figure 1:
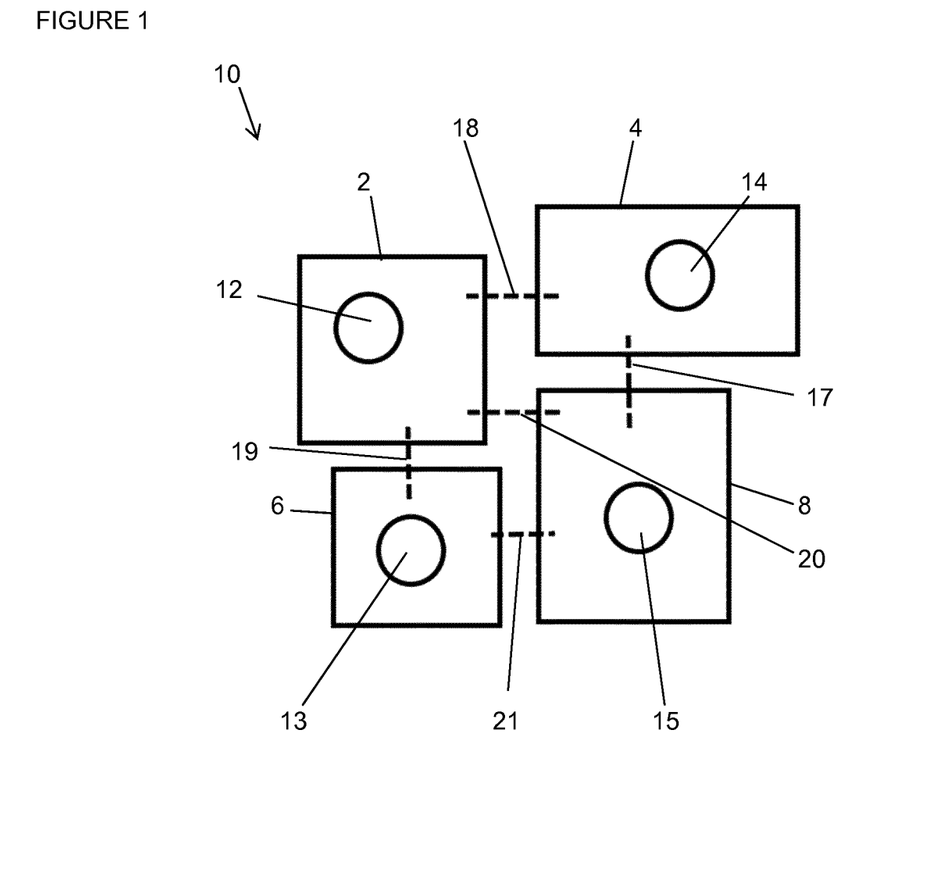
FIG. 1 is a diagrammatic representation of a portion of an electrical power network.
Figure 2:
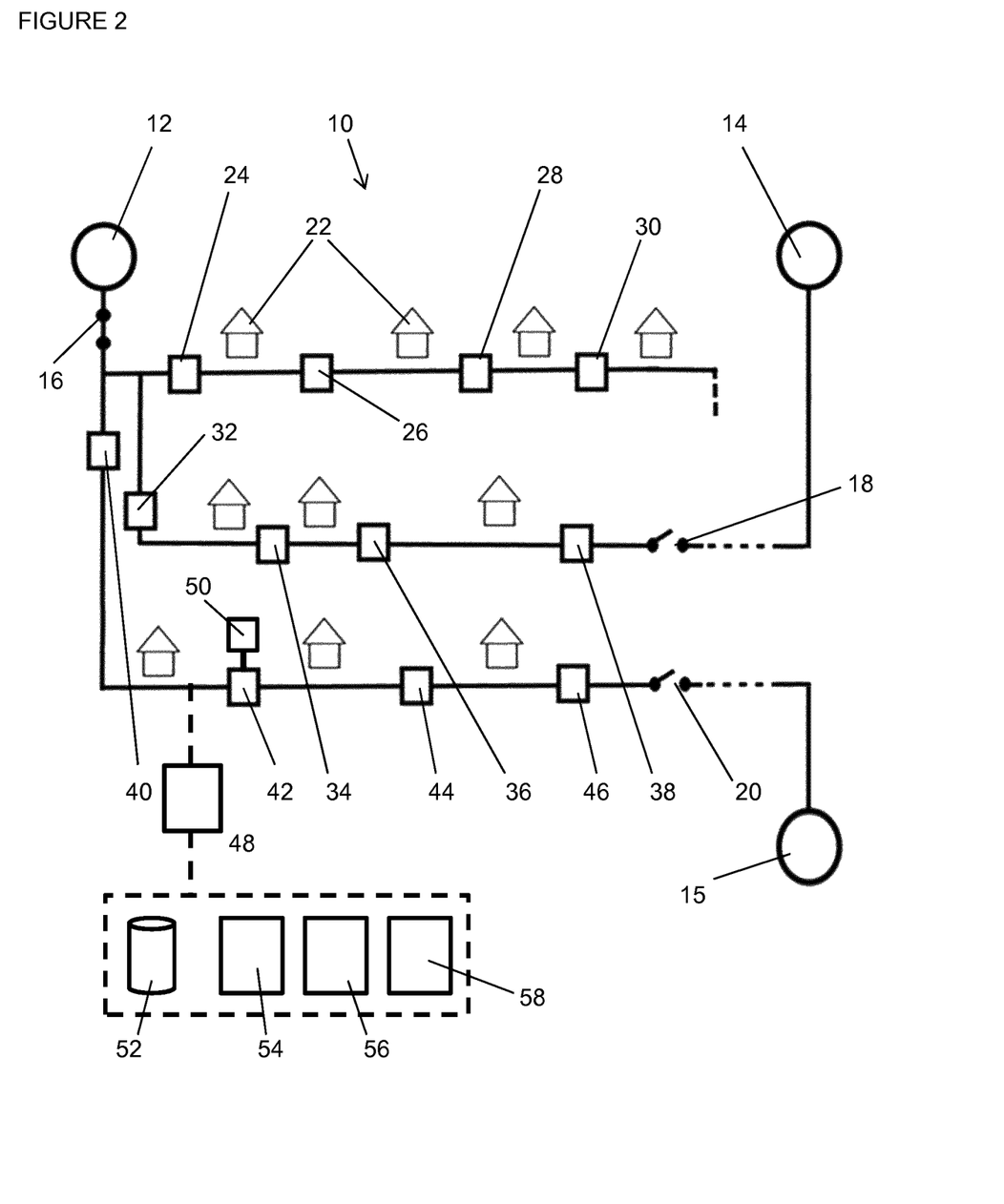
FIGS. 2 to 6 are diagrammatic representations of a portion of a region of an electrical power network having a control system according to embodiments of the invention.

With reference to FIGS. 1 and 2 of the drawings, a portion of an electrical power network 10 is shown. A plurality of electrical power supply facilities 12, 13, 14, 15 are connectable to a region 2, 4, 6, 8 of a network to provide electrical power to that region of the network. A region 2, 4, 6, 8 comprises a plurality of segments 22, each segment 22 being connectable to one or more neighbouring segments 22 by a respective switching device 24 (also shown as 26, 28, 30, 32, 34, 36, 38, 40, 42, 44, 46 in the Figures). In this way the switching devices 24 are operable to connect and disconnect electrical power transmission between the segments 22. During general operation, the switching devices 24 typically remain closed, and thus connected, so that electrical power is transmitted around the region 2, 4, 6, 8. Properties sharing a residential street, for example, may be powered by a single segment 22 of the network, and neighbouring streets powered by other respective segments 22.

The electrical power supply facilities 12, 13, 14, 15 are typically electrical substations, for converting electrical power supplied by power stations (including but not limited to thermal power stations using fossil fuels, nuclear power, geothermal power, biomass, or the like, renewable energy power stations including hydroelectric, solar, wind, marine, and osmosis and pumped storage energy providers including pumped-storage hydroelectricity, thermal energy storage, flywheel energy storage and battery storage for example) into a suitable form for consumers to draw from an electrical power transmission network forming the electrical grid. The electrical power supply facilities 12, 13, 14, 15 may include primary electrical power supply facilities associated with supplying electricity to the region, including a substation, a power generator, or a power storage apparatus, or any other suitable source of power to an electrical supply grid. The voltage is stepped down at the substations, to an appropriate distribution level to be supplied to the population. For example, in the United Kingdom electricity is supplied at 230V alternating current, within an error margin of +10% to −6%, and at 50 Hz.

Each electrical power supply facility 12, 13, 14, 15 is connected to the network via a respective circuit breaker 16 that is operable to disconnect the electrical power supply facility 12, 13, 14, 15 from the network in response to a fault condition. The fault condition may include an excessive current (i.e. above a pre-defined limit) being detected, caused by a short circuit or ground fault, for example. In such cases the circuit breaker 16 may trip, disconnecting the electrical power supply facility 12, 13, 14, 15 to avoid or reduce the likelihood of further malfunction or harmful conditions arising.

The network is typically split into distinct regions 2, 4, 6, 8, each typically being supplied with power from a respective electrical power supply facilities 12, 13, 14, 15. Multiple regions 2, 4, 6, 8 are capable of being connected to each other using network interconnection switches 17, 18, 19, 20, 21, to improve reliability. If a fault occurs or maintenance is required at a first electrical power supply facility 12 in a first region 2, for example, power supply to that region 2 is disrupted. Power may be supplied from an alternative electrical power supply facility 13, 14, 15 situated in another region 4, 6, 8, by connecting its respective network interconnection switch 17, 18, 19, 20, 21. In this way, power supply to the region 2 may be maintained with minimal impact to energy consumers.

However, when an unexpected fault occurs elsewhere within a region 2, 4, 6, 8, and its source is unknown, different mechanisms are required to find and isolate the fault, and restore power to the region. This is because, without having found and isolated the fault, reconnecting an electrical supply to the region will most likely result in the fault reoccurring, causing failure or disconnection of the connected electrical power supply facility 12, 13, 14, 15. Where, for example, a network interconnection switch 17, 18, 19, 20, 21 had been closed to connect another region 2, 4, 6, 8 of the network to supply electrical power from that region 2, 4, 6, 8, power in that connected region is likely to be disconnected, resulting in power being lost in a second region 2, 4, 6, 8. Where the term "switching device" is used, it should be understood that the switching device may be a standard switch, or a resettable fuse, or any other type of link as is known in the art.

A control system is associated with the network, which is used to oversee the functioning of the network. In embodiments, the control system is configured to carry out monitoring of the performance of the various devices on the network, and to ensure that the network is operated as required. The control system provides a controller 48 that is communicatively coupled with the switching devices 24 to 46 so as to operate the switching devices 24 to 46 remotely, via a communication interface 54. The communication may be performed via standard communication channels as is known in the art, such as via electrical communications buses, over a wired or wireless network, via satellite communication, or by any other suitable means.

The controller 48 includes a processing unit 56 comprising one or more processor cores and being operable to execute a plurality of process threads, as is known in the art. Multi-threading technology may be used to run threads concurrently so that routines performed by the threads run alongside one another, executing substantially simultaneously. It is known to assign executing threads to one or more distinct cores each, to ensure smooth parallel execution. It is also known to implement one or more virtual cores, to run multiple threads substantially simultaneously using a single core, if required. Any suitable processing unit must be operable to execute multiple threads concurrently.

The controller 48 is configured to execute a computer program that causes the control system to operate according to the method outlined below.

In embodiments, the control system includes a plurality of communication devices 50 each associated with a respective switching device 42 and/or forming part of the switching device. The communication devices 50 are configured to receive communications from the controller 48 to cause the associated switching device 42 to connect or disconnect the electrical power transmission between its associated segments 22.

Standard FLISR methods involve reconnecting electrical power to segments within a region sequentially—one at a time—until the fault is repeated. At that point, the segment in which the fault has occurred can be identified (as the last segment reconnected to the power supply). That segment can then be isolated (i.e. disconnected from the rest of the region) before the electrical power supply is restored.

As an example of a prior art system, if a fault occurs in a given region 2, the switching devices 24 to 46 are opened within that region 2 so that the segments 22 are disconnected from one another. The circuit breaker 16 is reset, reconnecting the electrical power supply facility 12 (e.g. the substation) to the region 2. In turn, each switching device 24, 26, 28, 30, 32, 34, 36, 38, 40, 42, 44, 46 is operated in turn, so as to reconnect electrical power supply to an unpowered segment 22. As each segment 22 is reconnected, a delay is provided to determine whether or not a fault has occurred. If a fault has occurred, then the original fault has been found and the segment 22 in which the fault is present has been identified. If not, the next segment in the sequence is reconnected. This continues until the fault is identified and isolated from the rest of the region 2. The average time taken to locate the fault is therefore in the order of N/2, where N is the number of segments in the region (i.e. N/2 segments must be reconnected on average, prior to locating the fault).

In embodiments of the invention, the method of fault isolation and electrical power restoration is applicable in general terms, to an electrical network comprising a plurality of electrical power supply facilities 12, 13, 14, 15 connectable to a region 2, 4, 6, 8 of a network to provide electrical power to that region 2, 4, 6, 8 of the network. In other words, each region 2, 4, 6, 8 provides its own electrical power supply facility 12, 13, 14, 15, and is also connectable to further electrical power supply facilities 12, 13, 14, 15 associated with the other regions, via their respective network interconnection switches 17, 18, 19, 20, 21. Of course, it should be understood that the electrical power supply facilities connectable to the region might include battery storage facilities, and other sources of electrical power, which may be connected to the grid intermittently when required.

The region 2, 4, 6, 8 comprises a plurality of segments 22 as described, each segment being 22 connectable to one or more neighbouring segments 22 by a respective switching device 24 to 46 operable to connect and disconnect electrical power transmission between the segments 22.

The method includes a step of detecting a fault condition within the region 2, 4, 6, 8. This can be achieved via feedback from sensors associated with the network, as is known in the art, detecting unexpected fluctuations in voltage, current or frequency, or the like, or by conditions causing hardware to trip thereby disconnecting power sources from the network. For example, the circuit breaker 16 associated with the electrical power supply facility 12 may trip, disconnecting the power from the network, by which the fault condition is detected.

In embodiments, the method includes operating the plurality of switching devices 24 to 46 connecting the segments 22 within the region so as to disconnect those segments 22 from one another. This step ensures that when the electrical power supply facility 12, 13, 14, 15 is reconnected (or connected via a network interconnect device 17 to 21), power is restored only to a single segment 22 at a time as the result of connecting a single switching device 24 to 46, during each reconnection routine. If some of the switching devices 24 to 46 remain connected, then reconnecting a segment 22 to provide power to that segment 22 may result in multiple adjoining segments 22 also receiving power at the same time. Any subsequent fault detected cannot then be traced to a single one of those segments 22 without carrying out further investigation or analysis. When the power to a segment 22 and its adjoining segments 22 is off it is effectively irrelevant whether or not the switching device between those segments 22 is connected or disconnected, up to the point at which one of them is reconnected. Therefore, while it is conceivable that one or more switching devices 24 to 46 remains connected, it is preferable that they do not—for safety and simplicity.

Subsequently, the method includes performing a reconnection routine for each of a plurality of reconnection zones, each reconnection zone comprising a distinct plurality of adjoining segments 22 within the region 2, 4, 6, 8. Each reconnection zone comprises a segment 22 that is connectable to one of the electrical power supply facilities 12, 13, 14, 15, so that each reconnection zone is associated with a different one of the electrical power supply facilities 12, 13, 14, 15. In embodiments, one of the reconnection zones is associated with a primary electrical power supply facility 12 associated with supplying electricity to the region 2 (i.e. the region's usual power supply, such as a local substation). The other electrical power supply facilities are one or more secondary facilities, each connectable to the region 2 via a network interconnection switching device 17, 18, 19, 20, 21. These secondary facilities may be the primary electrical power supply facilities of one or more other regions, for example. Looking at FIG. 1, the electrical power supply facility to a first region 2 is the first electrical power supply facility 12, and secondary supplies may be provided by second and third electrical power supply facilities 14 and 15, from respective second and third regions 4 and 8, for example, connectable by first and second network interconnect switching devices 18, 20.

The reconnection routines for each of the reconnection zones are run concurrently, so that the reconnection of power, sequentially, to each reconnection zone is achieved in as short a time as is possible. This ensures that power is restored promptly. In embodiments, the controller 48 executes the reconnection routines as threads running concurrently on the one or more processor cores. In embodiments, the processing may be distributed across more than one device, or across processing devices on a computer network, for example.

The reconnection routine involves the following steps:
a) selecting from the set of all unpowered segments 22 within the reconnection zone a single unpowered segment 22 that is connectable to a neighbouring powered segment 22 within the reconnection zone, or is connectible to the electrical power supply facility 12, 13, 14, 15 associated with the reconnection zone,
b) operating one or more switching devices 24 to 46 to connect the selected segment 22 to provide electrical power to that selected segment 22,
c) determining whether a fault has occurred within the reconnection zone,
d) if a fault is determined to have occurred at step c, setting a halt status and identifying the selected segment 22 as the segment causing the fault condition, or else repeating steps a to d until all segments 22 within the reconnection zone are electrically connected to the respective electrical power supply facility 12, 13, 14, 15, or until a halt status is set by another one of the concurrent reconnection routines.

On completion of the reconnection routines, a segment 22 has been identified as causing the fault condition. That identified segment 22 is isolated by operating the switching devices 24 to 46 associated with that segment 22 (i.e. any switching device 24 to 46 connecting that segment to any other segment 22) to disconnect that segment 22 from its neighbouring segments 22.

Once the identified segment has been isolated as above, the switching devices 24 to 46 throughout the rest of the region (i.e. excluding the identified isolated segment 22) are reconnected to one or more of the electrical power supply facilities. It may be the case that the primary electrical power supply facility within the region can be connected to all segments 22 other than the isolated segment 22. Otherwise, it one or more 'healthy' segments 22 may not be connectable to the primary electrical power supply facility due to the layout of the network within that region 2, 4, 6, 8, since those segments 22 are only connectable to that supply via the isolated segment 22. In that case, one or more network interconnect switching devices 17, 18, 19, 20, 21 may be connected so that power is provided from one or more of the respective secondary electrical power supply facilities (i.e. from the other regions). Preferably, for the reasons outlined above, the method includes a step of operating the all of the switching devices 24 to 46 within the region 2, 4, 6, 8, so as to disconnect the segments within the region 2, 4, 6, 8 from one another prior to performing the reconnection routines. In this way, the reconnection routines need only operate the switching devices 24 to 46 to connect segments 22, rather than also having to consider disconnecting segments 22 during the process to avoid multiple segments 22 being reconnected to power during a single operation.

In embodiments, the method includes identifying a test subset of the segments 22 within the region within which test subset the fault has occurred. This may be possible where fault-logging and analytical equipment is used to monitor the status of various parts of the network. As the fault occurs, and power is shut down, signs may be detected that indicate an approximate location of the fault. In that case, disconnecting power from the entire region may be unnecessary, and a subset of known 'healthy' segments may remain powered. The reconnection routines may be run solely on the subset of segments 22 which are not determined to be healthy, and in one of which the fault is likely to lie. In such a scenario, the step of operating the plurality of switching devices connecting the segments so as to disconnect those segments from one another is performed on segments within the test subset.

In embodiments, the controller 48 determines the plurality of reconnection zones and stores data representative of the segments 22 included in each reconnection zone. The data may be stored in a memory 58 or on a storage device 52 associated with the controller 48, for example. In embodiments, the plurality of reconnection zones is determined prior to detecting a fault condition within the region. It should also be noted that the order of selection of segments 22 in 'step a' of the reconnection routine may be predetermined and stored with the data defining the reconnection zones, so that, when the routine executes, 'step a' involves selecting the next segment 22 stored in a list.

As the control system operates the switching devices 24 to 46, or the network interconnection switching devices 17, 18, 19, 20, 21, a command is sent from the controller 48 to the respective switching device, via its associated communication device 50. The switching device then operates to connect or to disconnect the switch, accordingly. On completion, a signal is sent from the switching device via its associated communication device 50 back to the controller 48, to confirm that the switching action is complete. Therefore, given the two-way communication and time taken to physically alter the status of the switching device, a certain time delay is incurred with each switching action. As the reconnection routines are carried out, in addition to the delay for instructing the closing of switching devices (i.e. to connect neighbouring segments 22), a further delay is incurred in determining whether a fault condition has occurred. A fault may not occur immediately as power is supplied to the segment containing the fault, and therefore a set amount of time is allowed to lapse before an assumption is made that the segment 22 does not contain the fault.

It will be appreciated therefore that the ability to run multiple reconnection routines concurrently saves a substantial amount of time. This time directly affects the time during which the electrical power supply is offline for the majority of the segments in the region, and thus directly affects the level of inconvenience to consumers caused by a fault occurring in the network.

When N segments are present in a region, it would previously have taken a length of time proportional to N/2, on average, to determine the location of a fault and isolate the identified segment. Following the method of the present invention, that average time is reduced to a time proportional to N/2R, on average, where R is the number of reconnection zones implemented (which is limited by the number of network interconnect switching devices 17, 18, 19, 20, 21 joining other regions 4, 6, 8 to the target region 2).

As an example of the approach taken by the control system and method outlined above, FIG. 2 depicts a first region 2 of a network in which a first electrical power supply facility 12 is located, and connected to the region 2 via a circuit breaker 16. During normal operation, the segments 22 (depicted by houses, but which of course may contain any variety or combination of equipment and/or buildings whether industrial, residential, commercial, or for any other purpose) are connected to the first electrical power supply facility 12 via a plurality of switching devices 24 to 46.

Neighbouring regions 4, 8 (not shown) provide second and third respective electrical power supply facilities 14, 15. Those facilities, which are secondary electrical power supply facilities to the first region 2, can be connected to the region 2 via respective network interconnection switching devices 18, 20.

Figure 3:
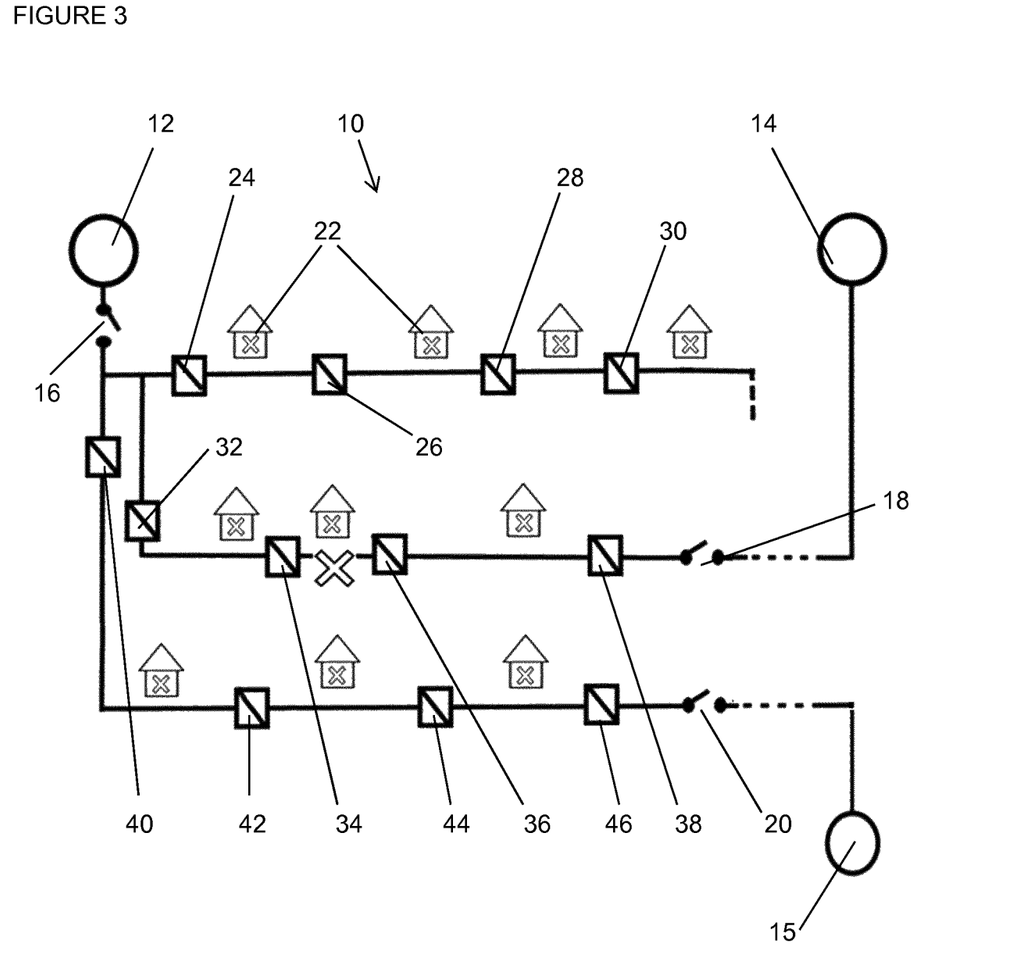

FIG. 3 illustrates the occurrence of a fault in the first region 2, in the segment defined between switching devices labelled 34 and 36. The fault triggers the circuit breaker 16 to trip, disconnecting the supply to the network. Each segment 22 within the region is shown to be disconnected from the power supply.

Due to the presence of one primary and two secondary electrical power supply facilities 12, 14, 15, connectable to the region 2, the region 2 is divided into three reconnection zones. The first comprises the segments 22 defined between switching devices 24, 26, 28, 30 along the uppermost row in the illustration, and is connectable to the first electrical power supply facility 12. The second comprises the segments defined between switching devices 32, 34, 36 and 38, along the middle row in the illustration, and is connectable to the second electrical power supply facility 14. The third comprises the segments defined between switching devices 40, 42, 44 and 46, along the lowermost row of the illustration, and is connectable to the third electrical power supply facility 15.

All of the switching devices 24 to 46 within the region are disconnected, according to a preferred embodiment, as described above. In addition, the circuit breaker 16 is reset, and the first and second network interconnection switching devices 18, 20 are closed so as to connect the second and third electrical power supply facilities 14, 15 to their respective reconnection zones.

Figure 4:
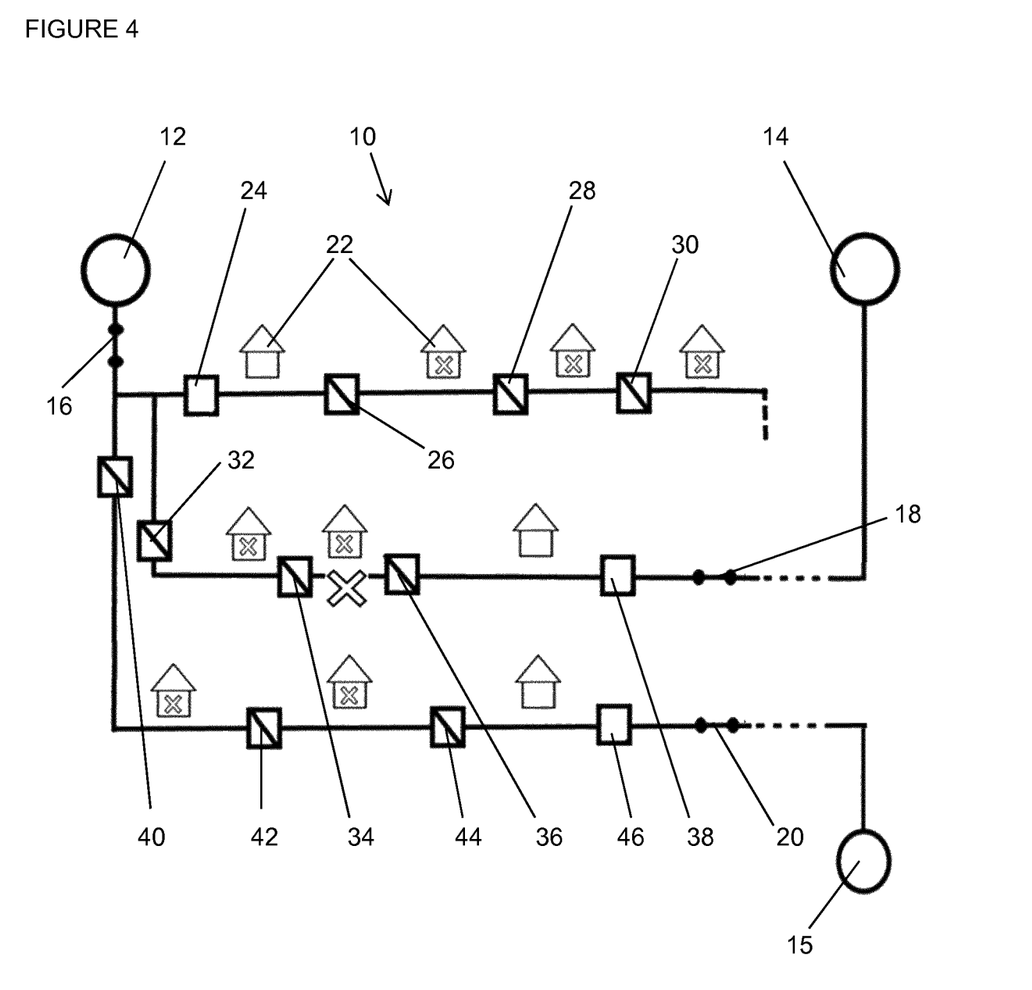

A reconnection routine is performed in relation to each of the three reconnection zones. At a first step, in each reconnection zone a zone is selected from those that are unpowered (i.e. all of them at this stage), and from those connectable to the respective source of power in that zone. Switching devices 24, 38, 46 are then operated to connect their associated segments to the power sources, as illustrated in FIG. 4. A delay occurs as the control system determines whether a fault has occurred within any one of the reconnection zones. Since it has not, the steps are repeated.

Figure 5:
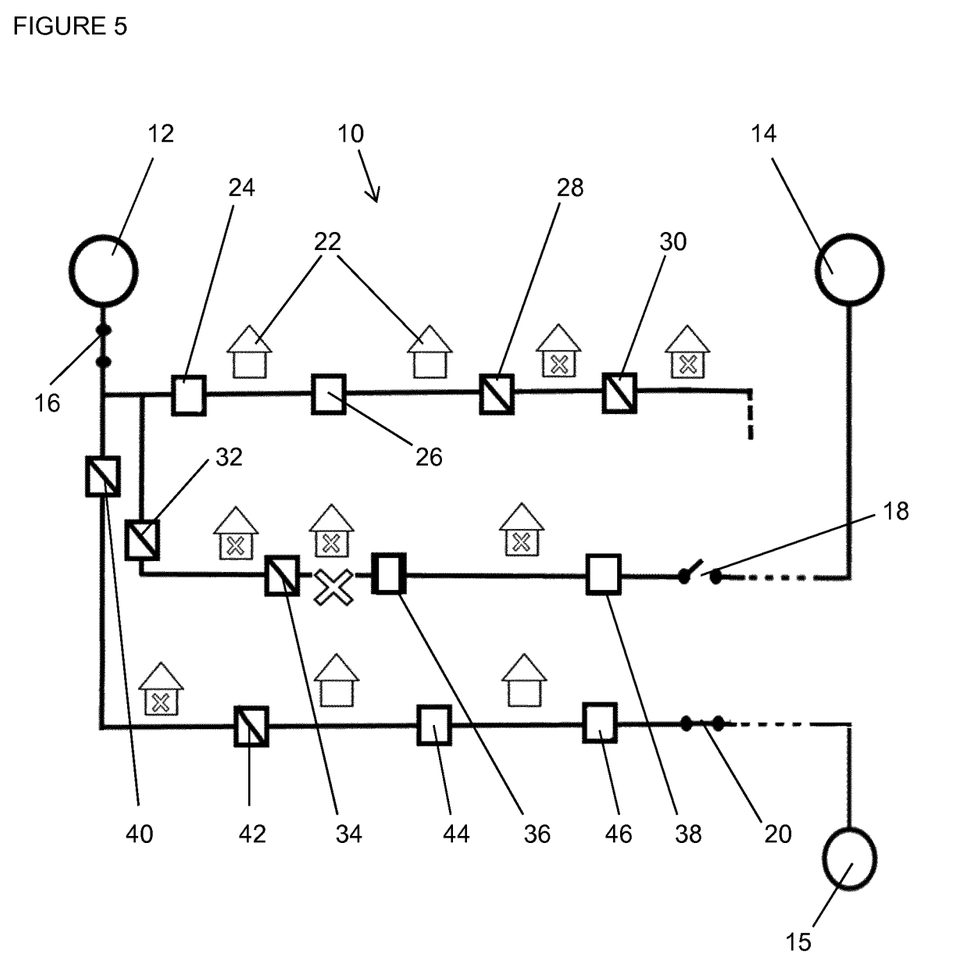

With reference to FIG. 5, after a second step, further switching devices 26, 36, 44 are operated so as to connect an additional respective segment to each reconnection zone. At this stage, it can be seen that the first and third reconnection zones operate normally, but that the second has encountered a fault. At this point, the second reconnection routine sets a halt status, indicating to the other executing routines that the fault has been detected. Those other routines then complete.

Figure 6:
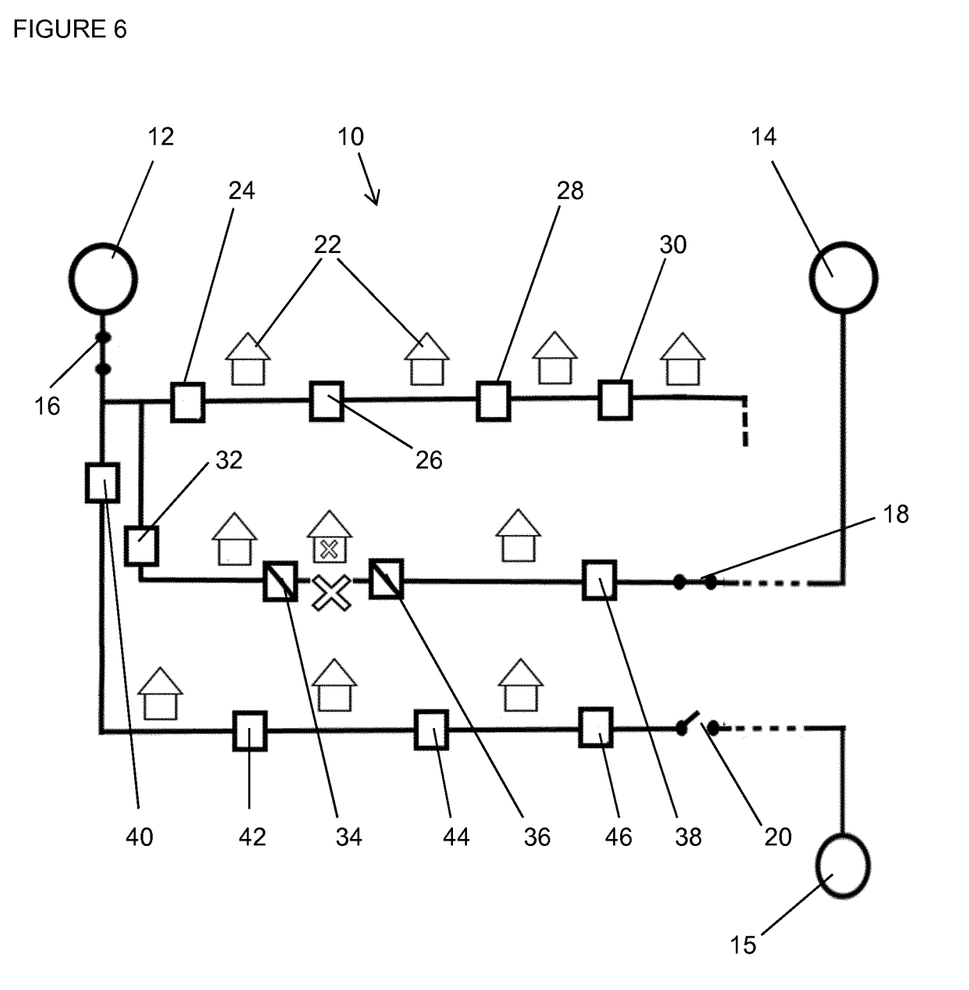

The segment identified as causing the fault condition is isolated, by operating the switching devices 34, 36 to disconnect that segment from its neighbouring segments. Once that segment has been isolated, the switching devices throughout the rest of the region 2 are operated to reconnect the segments 22 within the region to an electrical power supply facility 12, 14, excluding the identified isolated segment. As shown in FIG. 6, one or more segments 22 may be connected via a network interconnection switching device 18 to an electrical power supply facility 14 in a neighbouring region 4, for example.

While example embodiments of the invention are described herein, it should be understood that features of different embodiments may be combined with one another, in isolation from one another or in any combination, unless stated otherwise.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of fault isolation and electrical power restoration on an electrical network of the type comprising:
   a plurality of electrical power supply facilities connectable to a region of a network to provide electrical power to that region of the network, the region comprising a plurality of segments, and each segment being connectable to one or more neighbouring segments by a respective switching device operable to connect and disconnect electrical power transmission between the segments; and the method including the steps of:

detecting a fault condition within the region;

performing a reconnection routine for each of a plurality of reconnection zones, each reconnection zone comprising a distinct plurality of adjoining segments within the region and each comprising a segment that is connectable to one of the electrical power supply facilities so that each reconnection zone is associated with a different one of the electrical power supply facilities, the reconnection routines for each of the reconnection zones being run concurrently, and each including the steps a to d of:

a) selecting from the set of all unpowered segments within the reconnection zone a single unpowered segment that is connectable to a neighbouring powered segment within the reconnection zone, or is connectible to the electrical power supply facility associated with the reconnection zone, b) operating one or more switching devices to connect the selected segment to provide electrical power to that selected segment, c) determining whether a fault has occurred within the reconnection zone, d) if a fault is determined to have occurred at step c, setting a halt status and identifying the selected segment as the segment causing the fault condition, or else repeating steps a to d until all segments within the reconnection zone are electrically connected to the respective electrical power supply facility, or until a halt status is set by another routine;

isolating the segment identified as causing the fault condition by operating the switching devices to disconnect that segment from its neighbouring segments; and operating the switching devices to reconnect the segments within the region to an electrical power supply facility, excluding the identified isolated segment.

2. The method of claim 1, further comprising a step of operating the plurality of switching devices connecting the segments within the region so as to disconnect those segments from one another prior to performing the reconnection routines.

3. The method of claim 1, wherein the plurality of electrical power supply facilities includes a primary electrical power supply facility associated with supplying electricity to the region, and one or more secondary electrical power supply facilities each connectable to the region via a network interconnection switching device.

4. The method of claim 1, wherein each electrical power supply facility is connected to the network via a respective circuit breaker operable to disconnect the electrical power supply facility from the network in response to a fault condition.

5. The method of claim 1, further comprising a step of connecting each electrical power supply facility to its respective reconnection zone prior to performing the reconnection routine.

6. The method of claim 1, further including the step of identifying a test subset of the segments within the region within which test subset the fault has occurred, wherein each reconnection zone comprises a distinct plurality of adjoining segments within the test subset.

7. The method of claim 1, wherein each electrical power supply facility comprises at least one of: a substation, a power generator and a power storage device.

8. The method of claim 1, wherein the electrical network includes a control system comprising a controller in communication with the switching devices so as to operate the switching devices remotely, and wherein operating a switching device comprises using the controller to operate the switching device remotely.

9. The method of claim 8, wherein the control system is operable to perform the reconnection routines.

10. The method of claim 9, wherein the controller comprises a processing unit comprising one or more processing cores and being operable to execute a plurality of process threads, and wherein the reconnection routines are processed using different process threads.

11. The method of claim 2, wherein the plurality of electrical power supply facilities includes a primary electrical power supply facility associated with supplying electricity to the region, and one or more secondary electrical power supply facilities each connectable to the region via a network interconnection switching device.

12. The method of claim 11, wherein each electrical power supply facility is connected to the network via a respective circuit breaker operable to disconnect the electrical power supply facility from the network in response to a fault condition.

13. The method of claim 12, further comprising a step of connecting each electrical power supply facility to its respective reconnection zone prior to performing the reconnection routine.

14. The method of claim 13, wherein the electrical network includes a control system comprising a controller in communication with the switching devices so as to operate the switching devices remotely, and wherein operating a switching device comprises using the controller to operate the switching device remotely.

15. The method of claim 14, wherein the control system is operable to perform the reconnection routines; and wherein the controller comprises a processing unit comprising one or more processing cores and being operable to execute a plurality of process threads, and wherein the reconnection routines are processed using different process threads.

16. A control system for performing fault isolation and electrical power restoration on an electrical network, of the type comprising:

a plurality of electrical power supply facilities connectable to a region of a network to provide electrical power to that region of the network, the region comprising a plurality of segments, and each segment being connectable to one or more neighbouring segments by a respective switching device operable to connect and disconnect electrical power transmission between the segments; and the control system comprising a controller that is communicatively coupled with the switching devices so as to operate the switching devices remotely, the controller having a processing unit comprising one or more processor cores and being operable to execute a plurality of process threads, the controller being configured to:

detect a fault condition within the region;

execute a plurality of reconnection routines as threads running concurrently on the one or more processor cores, each reconnection routine being associated with a respective reconnection zone comprising a distinct plurality of adjoining segments within the region and each comprising a segment that is connectable to one of the electrical power supply facilities so that each reconnection zone is associated with a different one of the electrical power supply facilities, the reconnection routine including the steps a to d of:

a) selecting from the set of all unpowered segments within the reconnection zone a single unpowered segment that is connectable to a neighbouring powered segment within the reconnection zone, or is connectible to the electrical power supply facility associated with the reconnection zone, b) operating one or more switching devices to connect the selected segment to provide electrical power to that selected segment, c) determining whether a fault has occurred within the reconnection zone, d) if a fault is determined to have occurred at step c, setting a halt status and identifying the selected segment as the segment causing the fault condition, or else repeating steps a to d until all segments within the reconnection zone are electrically connected to the respective electrical power supply facility, or until a halt status is set by another one of the concurrent reconnection routines;

operating switching devices associated with the segment identified as causing the fault condition to disconnect that segment from its neighbouring segments; and operating the switching devices to reconnect the segments within the region to an electrical power supply facility, other than the switching devices associated with the identified isolated segment.

17. The control system of claim 16, further including a plurality of communication devices each associated with a respective switching device, configured to receive communications from the controller to cause the switching device to connect or disconnect the electrical power transmission between its associated segments.

18. The control system of claim 16, wherein the controller is configured to determine the plurality of reconnection zones and to store data representative of the segments included in each reconnection zone.

19. The control system of claim 17 wherein the plurality of reconnection zones are determined prior to detecting a fault condition within the region.

20. A computer program product for a control for performing fault isolation and electrical power restoration on an electrical network of the type including a plurality of electrical power supply facilities connectable to a region of a network to provide electrical power to that region of the network, the region comprising a plurality of segments, and each segment being connectable to one or more neighbouring segments by a respective switching device operable to connect and disconnect electrical power transmission between the segments, the computer program product comprising a non-transitory computer readable storage medium having program code embodied therein, wherein the program code when executed performs operations, the operations comprising:

detecting a fault condition within the region;

performing a reconnection routine for each of a plurality of reconnection zones, each reconnection zone comprising a distinct plurality of adjoining segments within the region and each comprising a segment that is connectable to one of the electrical power supply facilities so that each reconnection zone is associated with a different one of the electrical power supply facilities, the reconnection routines for each of the reconnection zones being run concurrently, and each including the steps a to d of:

a) selecting from the set of all unpowered segments within the reconnection zone a single unpowered segment that is connectable to a neighbouring powered segment within the reconnection zone, or is connectible to the electrical power supply facility associated with the reconnection zone, b) operating one or more switching devices to connect the selected segment to provide electrical power to that selected segment, c) determining whether a fault has occurred within the reconnection zone, d) if a fault is determined to have occurred at step c, setting a halt status and identifying the selected segment as the segment causing the fault condition, or else repeating steps a to d until all segments within the reconnection zone are electrically connected to the respective electrical power supply facility, or until a halt status is set by another routine;

isolating the segment identified as causing the fault condition by operating the switching devices to disconnect that segment from its neighbouring segments; and operating the switching devices to reconnect the segments within the region to an electrical power supply facility, excluding the identified isolated segment.

* * * * *